United States Patent [19]

Hartmann et al.

[11] 4,239,837
[45] Dec. 16, 1980

[54] ELECTROCHEMICAL STORAGE CELL

[75] Inventors: Bernd Hartmann, Sandhausen; Herbert Kleinschmager, Eppelheim, both of Fed. Rep. of Germany

[73] Assignee: Brown, Boveri & Cie Aktiengesellschaft, Mannheim, Fed. Rep. of Germany

[21] Appl. No.: 26,805

[22] Filed: Apr. 3, 1979

[30] Foreign Application Priority Data

Apr. 6, 1978 [DE] Fed. Rep. of Germany ....... 2814905

[51] Int. Cl.² .......................................... H01M 10/38
[52] U.S. Cl. .................................. 429/104; 429/163; 220/450
[58] Field of Search ........................ 429/104, 102–103, 429/176, 163; 220/450, 455, 457, 456

[56] References Cited

U.S. PATENT DOCUMENTS

| | | | |
|---|---|---|---|
| 3,959,013 | 5/1976 | Breiter | 429/104 X |
| 4,048,391 | 9/1977 | Tilley et al. | 429/104 |
| 4,084,040 | 4/1978 | King | 429/104 |
| 4,125,682 | 11/1978 | Bordet et al. | 429/104 |
| 4,131,226 | 12/1978 | Breiter et al. | 429/104 X |

*Primary Examiner*—Anthony Skapars
*Attorney, Agent, or Firm*—Herbert L. Lerner

[57] ABSTRACT

An electrochemical storage cell or battery with an anode space for an alkali metal as the anolyte and with a cathode space for a sulfur-containing catholyte substance, which are separated from each other by an alkali-ion-conducting solid electrolyte and are confined by a cell wall of metal, particularly of a light metal or steel. Long-life corrosion protection of the metal cell wall is provided by a protective layer by applying to at least that part of the metal cell wall in contact with the catholyte substance, a foil of corrosion-resistant material 0.01 to 0.2 mm thick by means of a conductive adhesive which retains its adhesive properties at operating temperatures.

16 Claims, 1 Drawing Figure

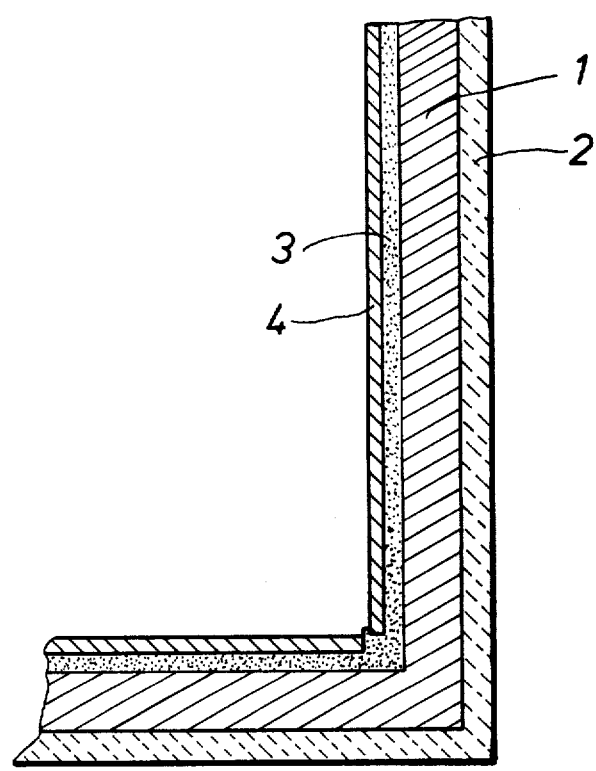

ELECTROCHEMICAL STORAGE CELL

BACKGROUND OF THE INVENTION

1. Field of the Invention

The invention relates to an electrochemical storage cell or battery with at least one anode space provided for an alkali metal as the anolyte and with at least one cathode space provided for a sulfur-containing catholyte substance, which spaces are separated from each other by an alkali-ion-conducting solid electrolyte and are confined by a cell wall of metal, particularly of a light metal or steel.

2. Description of the Prior Art

Storage cells of the above-mentioned kind have assumed increased importance in recent years in view of their use as stationary and also mobile energy storage devices with a high energy density. Metal and in particular, a light metal or steel is preferred as the material for the cell walls, because of the easy machinability and, because of the good mechanical and electrical properties.

If steel is used, it has been found that the corrosion resistance is far from sufficient for long-term batteries and that additional measures must be taken. As far as light metal and in particular, aluminum, are concerned, the corrosion resistance is better there, but poorly conducting layers are formed which change the electrical properties of the battery so that further operation is no longer possible because of the high resistance.

In an effort to solve this problem, an attempt was made to protect a cell wall consisting of light metal against corrosion by means of a coating of $MoS_2$ (see U.S. Pat. No. 3,749,603).

It has also been attempted to provide the current collector, in the case on an inversely built-up cell, with a layer of carbon or graphite, in order to improve its corrosion behavior (see German Published Non-Prosecuted Application 2 549 544).

Inherent in the above-mentioned attempts, however, are disadvantages regarding the reliability of the layer. Also, the preparation of such layers requires considerable expense.

SUMMARY OF THE INVENTION

It is an object of the present invention to provide an electro-chemical storage cell or battery with reliable, long-life corrosion protective layers for the protection of the cell wall and for preventing the reactants from escaping from the cell. At the same time this protection is produced simply and inexpensively. Also, the protective layers applied inside the cell wall have high electric conductivity.

With the foregoing and other objects in view, there is provided in accordance with the invention an electro-chemical storage cell or battery with at least one anode chamber for an alkali metal as the anolyte and with at least one cathode chamber for a sulfur-containing catholyte substance, with the anode chamber and the cathode chamber separated from each other by an alkali-ion-conducting solid electrolyte and the cell confined by a cell wall of metal, particularly of a light metal or steel, the improvement comprising a protective layer for long-life corrosion protection of the metal cell wall, by applying to the metal cell wall, at least to that part of the metal cell wall which is in contact with the catholyte substance, a foil of corrosion-resistant material 0.01 to 0.2 mm thick by means of a conductive adhesive which retains its adhesive properties at operating temperatures of the cell.

Other features which are considered as characterstic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following descriptions when read in connection with the accompanying drawing in which is illustrated a cross section through a cell or housing wall to show the cell wall proper of steel, an inside graphite foil applied by means of an adhesive and an outside enamel coating.

DETAILED DESCRIPTION OF THE INVENTION

In accordance with the invention, in a cell or battery of the type mentioned at the outset, a foil of corrosion-resistant material with a thickness of 0.01 to 0.2 mm by means of a conductive adhesive, which retains its adhesive properties at the operating temperature, is applied on the cell wall, at least in the region which is in contact with the catholyte substance.

An adhesive of the phenol formaldehyde resin type is preferred, but other suitable adhesives which retain their adhesive properties at operating temperatures of up to 350° C. may be employed. The above-mentioned adhesive is converted during operation into a layer of "synthetic carbon," which meets the requirements as to high conductivity and good adhesion. In the case of metallic foils, those of titanium or zirconium or their alloys have proven themselves by actual usage. Also foils of superalloys as well as of tungsten, niobium and tantalum may be used. With the exception of the foils made of superalloys, their thickness can be reduced to 0.01 to 0.02 mm without loss of the reliability demanded. In the case of superalloys, the thickness is desirably somewhat larger, preferably 0.05 to 0.15 mm.

Depending on the material of which the cell housing consists, a layer of corrosion-resistant material may be applied on the outside of the cell housing instead of or in addition to the layer applied on the inside. In the case of material applied to the outside of the housing, the conductivity of the outside layer does not matter, so that especially corrosion-resistant materials such as oxides or silicates can be used which are not usable for protecting the cell wall toward the inside. Particularly suitable is enamelling the cell housing if the latter consists of steel or another alloy suitable for this purpose. One particularly simple measure is to apply foils which contain corrosion-resistant material such as oxides or silicates and the like, to the outside of the housing in a temperature-resistant manner, especially to the bottom and side walls.

Through applying a corrosion-resistant layer to the outside of the housing of the individual cells, additional security is to be provided for the situation where contrary to normal expectations, the cell wall corrodes through from the inside, or the situation in the event of a break of the solid electrolyte, with the result that the cell wall is destroyed by the greatly increased temperature in the interior of the cell and the increased corrosion connected therewith.

If adhesive is used for applying layers or foils to the outside of the housing, it should be noted that then there are no requirements as to the conductivity. Therefore, other adhesives such as those based on epoxy resin may also be used. The last-mentioned type is singled out particularly because of its high temperature resistance.

In the following, the invention will be explained in further detail with the aid of an embodiment example in conjunction with the drawing. The drawing diagrammatically shows a cross section through a cell or housing wall. The cell wall proper, designated by numeral 1, may consist, for instance, of steel. It has a thickness of about 0.5 mm. On the outside, the cell wall is provided with a wet enamel coating 2 with a thickness of about 0.15 mm. The layer contains quartz, borax, feldspar, titanium oxide and other oxides in smaller amounts. On the inside, a graphite foil 4, 0.05 mm thick, is applied by means of an adhesive layer 3, of phenol formaldehyde resin, to which synthetic carbon in powder form is admixed. The adhesive can be applied in many different ways, as for instance, by spraying-on a suitably diluted solution.

In a conventionally constructed cell with a cell wall coated as described above, operating times of more than 1000 hours have been obtained without observing a change in the layers or the electrical data. The operating temperature was about 360° C.

Further corrosion tests were carried out with other foil materials, among others with titanium 0.1 mm thick. Here, too, no appreciable changes were found in operation for over 1000 hours at 360° C.

Furthermore, a breakthrough of the solid electrolyte was simulated in a test, wherein the temperature increased to 570° C. due to a direct chemical reaction of sodium with the catholyte melt. The rate of corrosion corresponding to this temperature would destroy a cell wall of 14572 steel 1 mm thick in a very short time. In the case of the above-described test cell, however, such destruction did not take place during the reaction cycle, with the cell wall which consisted of the mentioned steel only 0.5 mm thick, and in particular, no reactants escaped to the outside, so that there was no possibility of an adverse effect on the environment.

There are claimed:

1. An electrochemical storage cell or battery with at least one anode chamber for an alkali metal as the anolyte and with at least one cathode chamber for a sulfur-containing catholyte substance, with the anode chamber and the cathode chamber separated from each other by an alkali-ion-conducting solid electrolyte and the cell confined by a cell wall of metal, particularly of a light metal or steel, the improvement comprising a protective layer having two sublayers consisting of an inner sublayer adjacent the cell wall and an outer sublayer adjacent the inner sublayer for long-life corrosion protection of the metal cell wall, by applying to the metal cell wall, at least to that part of the metal cell wall which is in contact with the catholyte substance, a foil of corrosion-resistant material 0.01 to 0.2 mm thick as the outer sublayer by means of a conductive adhesive as the inner sublayer which retains its adhesive properties at operating temperatures of the cell, and a protective layer of corrosion-resistant material applied to the outside of the cell housing in addition to the layer applied to the cell wall on the inside.

2. Storage cell or battery according to claim 1, wherein the adhesive is a phenol formaldehyde resin.

3. Storage cell or battery according to claim 2, wherein the foil is a member of the group consisting of titanium, a titanium alloy, zirconium, a zirconium alloy and molybdenum.

4. Storage cell or battery according to claim 3, wherein the foil is titanium.

5. Storage cell or battery according to claim 3, wherein the foil is a titanium alloy.

6. Storage cell or battery according to claim 3, wherein the foil is zirconium.

7. Storage cell or battery according to claim 3, wherein the foil is a zirconium alloy.

8. Storage cell or battery according to claim 1 or claim 2, wherein the foil is graphite.

9. Storage cell according to claims 1 or 2 or 3, wherein silicates are applied as the corrosion-resistant material to the outside of the cell housing.

10. Storage cell according to claims 1 or 2 or 3, wherein oxides are applied as the corrosion-resistant material to the outside of the cell housing.

11. Storage cell or battery according to claims 1 or 2 or 3, wherein a layer of enamel is applied to the outside of the cell housing.

12. Storage cell or battery according to claims 1 or 2 or 3, wherein foils of corrosion-resistant material containing oxides are cemented-on in a temperature-resistant manner to the outside surfaces of the cell housing.

13. Storage cell or battery according to claims 1 or 2 or 3, wherein foils of corrosive resistant material containing silicates are cemented-on in a temperature resistant manner to the outside surface of the cell housing.

14. An electrochemical storage cell or battery with at least one anode chamber for an alkali metal as the anolyte and with at least one cathode chamber for a sulfur-containing catholyte substance, with the anode chamber and the cathode chamber separated from each other by an alkali-ion-conducting solid electrolyte and the cell confined by a cell wall of metal, particularly of a light metal or steel, the improvement comprising a protective layer having two sublayers consisting of an inner sublayer adjacent the cell wall and an outer sublayer adjacent the inner sublayer for long-life corrosion protection of the metal cell wall, by applying to the metal cell wall, at least to that part of the metal cell wall which is in contact with the catholyte substance, a foil of corrosion-resistant material consisting of graphite 0.01 to 0.2 mm thick as the outer sublayer by means of a conductive adhesive containing phenol formaldehyde resin as the inner sublayer which retains its adhesive properties at operating temperatures of the cell, and a foil of corrosion-resistant material containing oxides cemented-on in a temperature resistant manner to the outside surface of the cell housing.

15. An electrochemical storage cell or battery with at least one anode chamber for an alkali metal as the anolyte and with at least one cathode chamber for a sulfur-containing catholyte substance, with the anode chamber and the cathode chamber separated from each other by an alkali-ion-conducting solid electrolyte and the cell confined by a cell wall of metal, particularly of a light metal or steel, the improvement comprising a protective layer having two sublayers consisting of an inner sublayer adjacent the cell wall and an outer sublayer adjacent the inner sublayer for long-life corrosion protection of the metal cell wall, by applying to the metal cell wall, at least to that part of the metal cell wall which is in contact with the catholyte substance, a foil of corrosion-resistant material consisting of graphite 0.01 to 0.2 mm thick as the outer sublayer by means of a conductive adhesive containing phenol formaldehyde resin as the inner sublayer which retains its adhesive properties at operating temperatures of the cell and a foil of corrosion-resistant material containing silicates cemented-on in a temperature resistant manner to the outside surface of the cell housing.

16. Storage cell or battery according to claims 1 or 2 or 3 or 14 or 15, wherein carbon in finely divided form is admixed with the adhesive.

* * * * *